United States Patent [19]
Padovani

[11] Patent Number: 5,591,463
[45] Date of Patent: Jan. 7, 1997

[54] APPARATUS FOR THE THERMOFORMING AND STACKING OF HOLLOW OBJECTS INCORPORATING A BASE FORMED FROM THERMOPLASTICS SHEET MATERIAL

[75] Inventor: Pietro Padovani, Verona, Italy

[73] Assignee: ISAP OMV Group S.p.A., Verona, Italy

[21] Appl. No.: 216,922

[22] Filed: Mar. 23, 1994

Related U.S. Application Data

[63] Continuation of Ser. No. 937,362, Aug. 28, 1992, abandoned.

[30] Foreign Application Priority Data

Feb. 3, 1992 [IT] Italy ................... VR92A0012

[51] Int. Cl.⁶ ................................. B29C 51/20
[52] U.S. Cl. ................ 425/359; 264/153; 264/155; 264/163; 264/280; 264/297.7; 425/73; 425/292; 425/397; 425/398; 425/403.1; 425/420; 425/DIG. 201
[58] Field of Search ................... 425/345, 349, 425/358, 359, 398, 399, 400, 403.1, 527, 397, 73, 292, 296, 420, DIG. 201; 264/280, 322, 163, 297.7, 153, 155, 156; 206/519; 198/800

[56] References Cited

U.S. PATENT DOCUMENTS

| | | |
|---|---|---|
| 2,195,326 | 3/1940 | Crawford et al. . |
| 3,417,428 | 12/1968 | Rupert . |
| 3,499,063 | 3/1970 | Ninneman et al. . |
| 3,540,371 | 11/1970 | Rudolph et al. . |
| 4,043,736 | 8/1977 | Andres, IV et al. . |
| 4,105,736 | 8/1978 | Padovani . |
| 4,560,339 | 12/1985 | Padovani . |
| 4,804,322 | 2/1989 | Turtschan . |
| 4,872,826 | 10/1989 | Padovani . |
| 4,877,151 | 10/1989 | Rush et al. . |
| 4,932,856 | 6/1990 | Merklinghaus et al. . |
| 5,122,030 | 6/1992 | Schmeisser et al. . |

FOREIGN PATENT DOCUMENTS

| | | |
|---|---|---|
| 3724178 | 6/1988 | Germany . |
| 61-47232 | 3/1986 | Japan . |
| 625742 | 10/1981 | Switzerland . |
| 2149717 | 6/1985 | United Kingdom . |

OTHER PUBLICATIONS

Patent Abstract of Japan vol. 10, No. 207 (M–500) (2263) 19 Juillet 1986.

*Primary Examiner*—Jay H. Woo
*Assistant Examiner*—Joseph Leyson
*Attorney, Agent, or Firm*—Ladas & Parry

[57] ABSTRACT

Apparatus for the thermoforming of hollow objects at a base comprises thermoforming of the objects from a sheet of thermoplastics material in a half of a double female mould that can be moved between a forming area against a male die and a discharge area to one or the other side of the forming area. The thermoformed objects are transferred from the discharge area onto a plurality of receiving formers moving sequentially stepwise along a track. One or more processing or handling operations are performed on the objects while the formers are stationary.

13 Claims, 7 Drawing Sheets

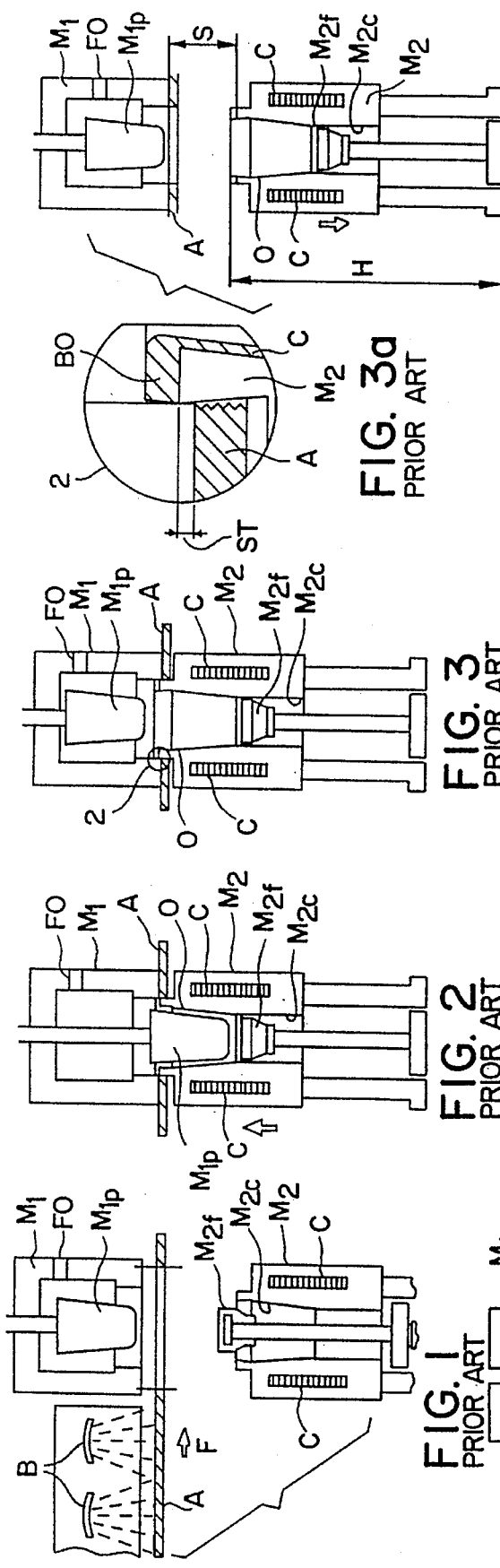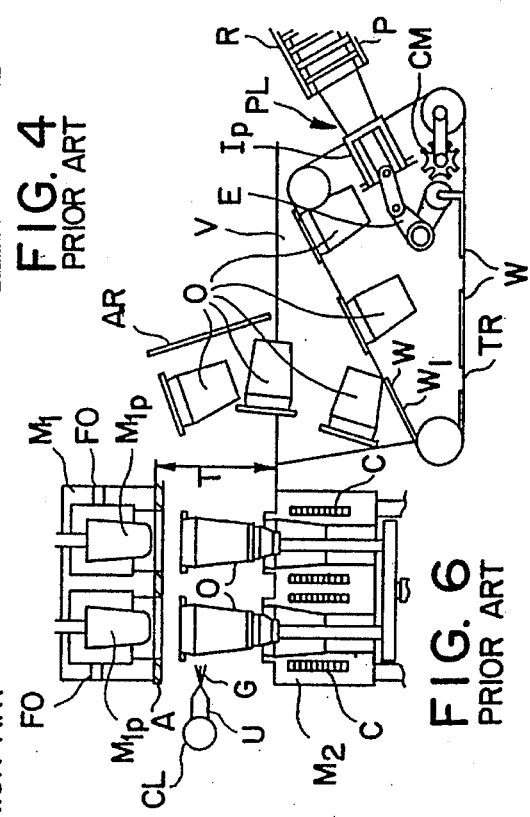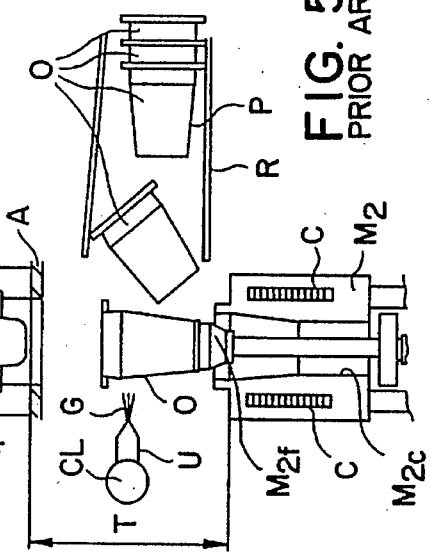

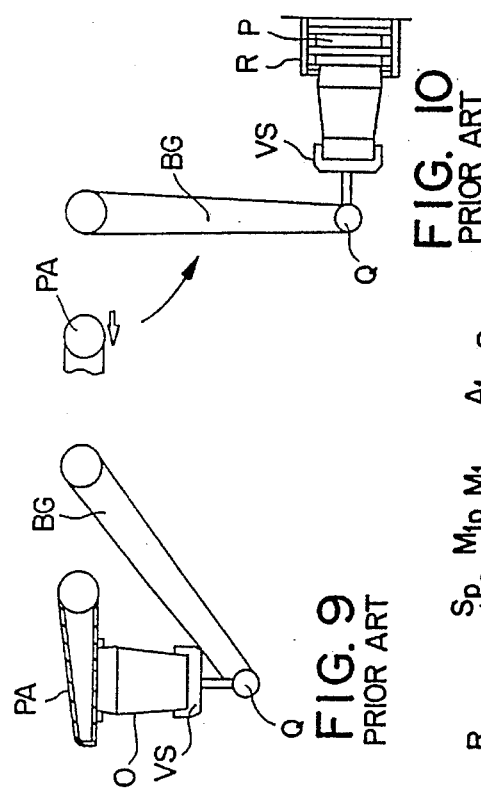
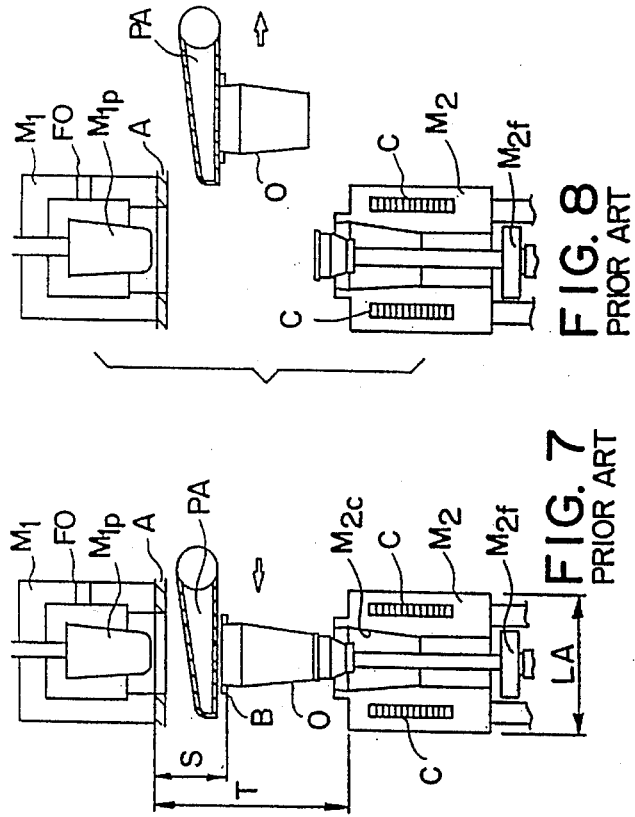
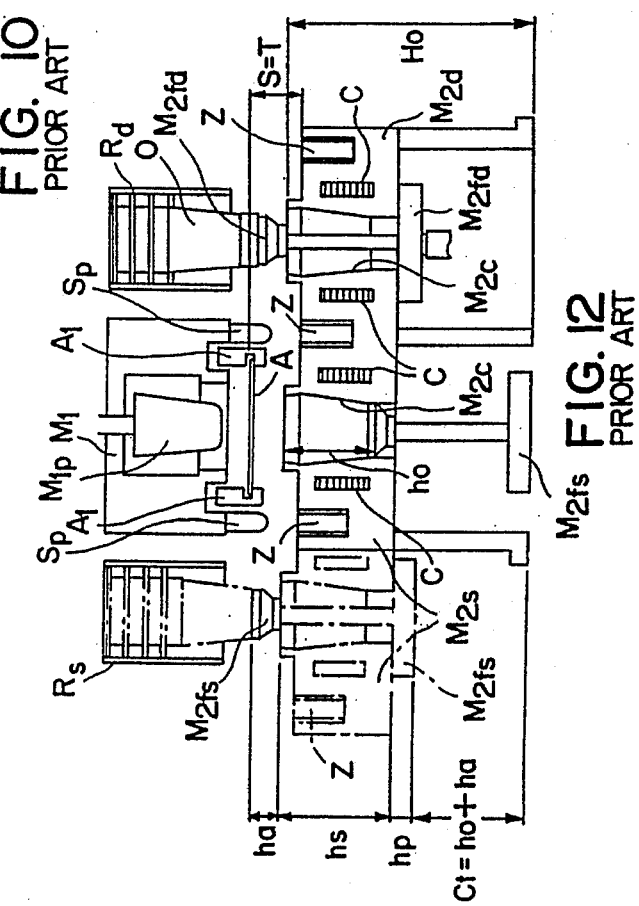
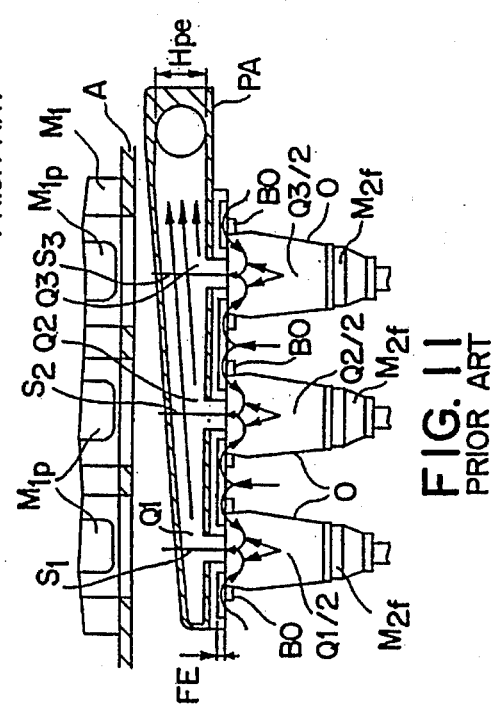

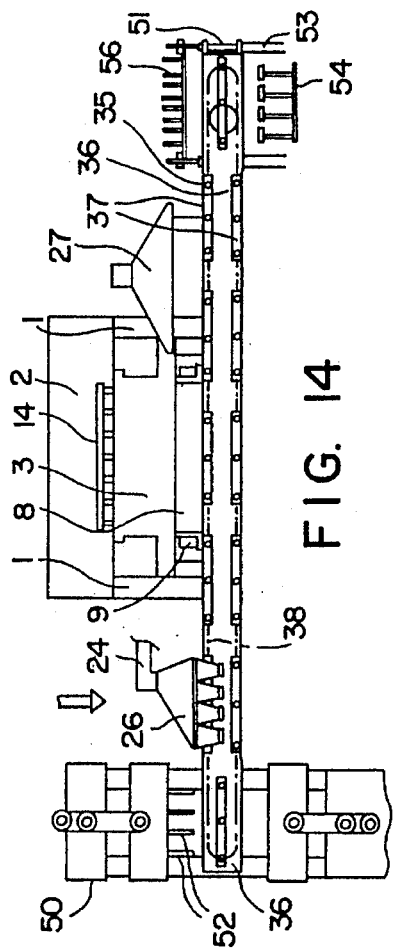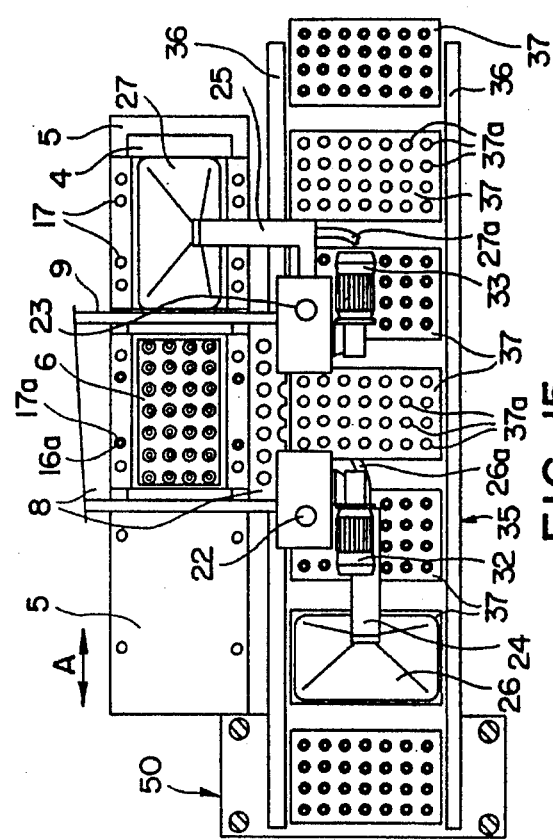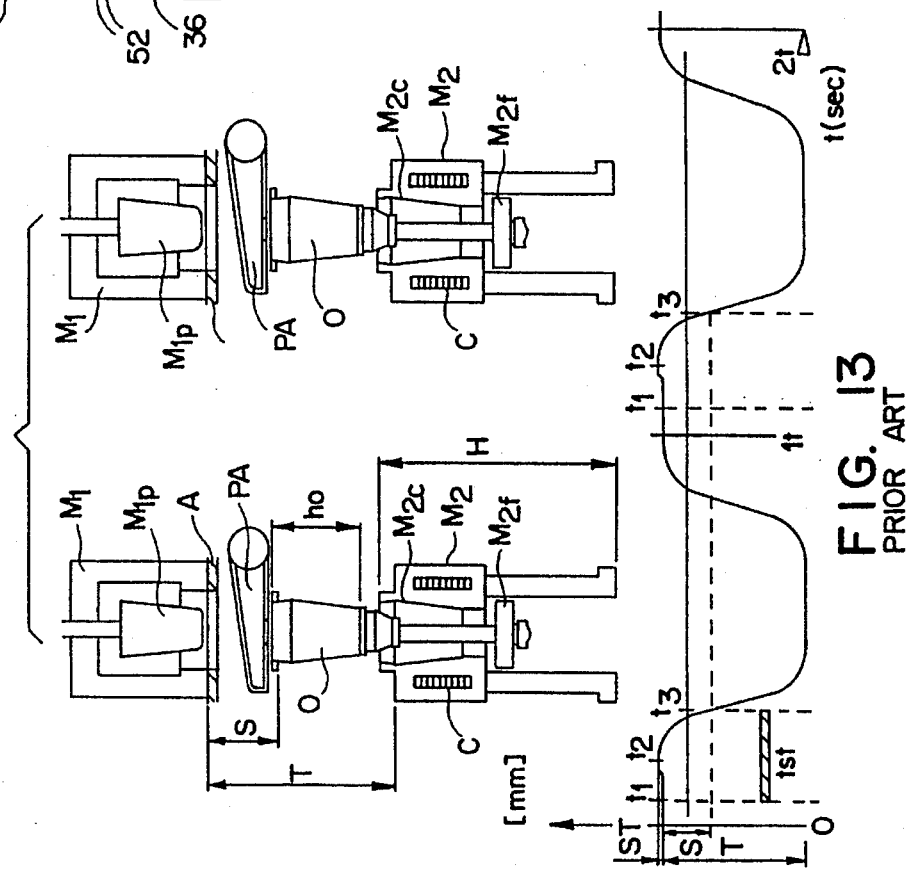

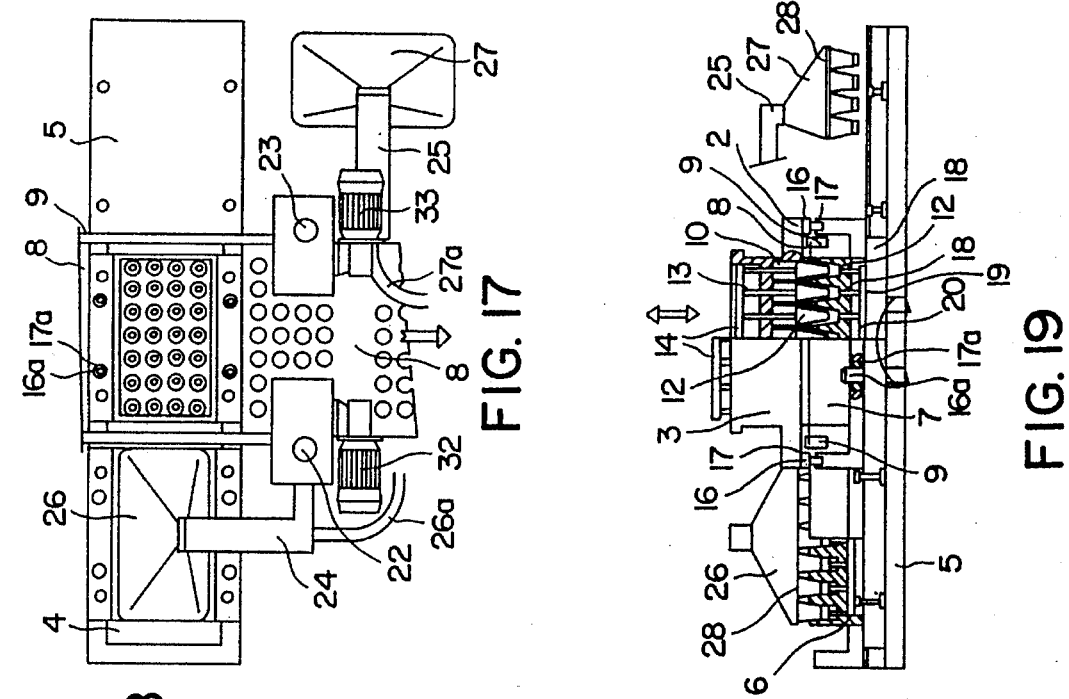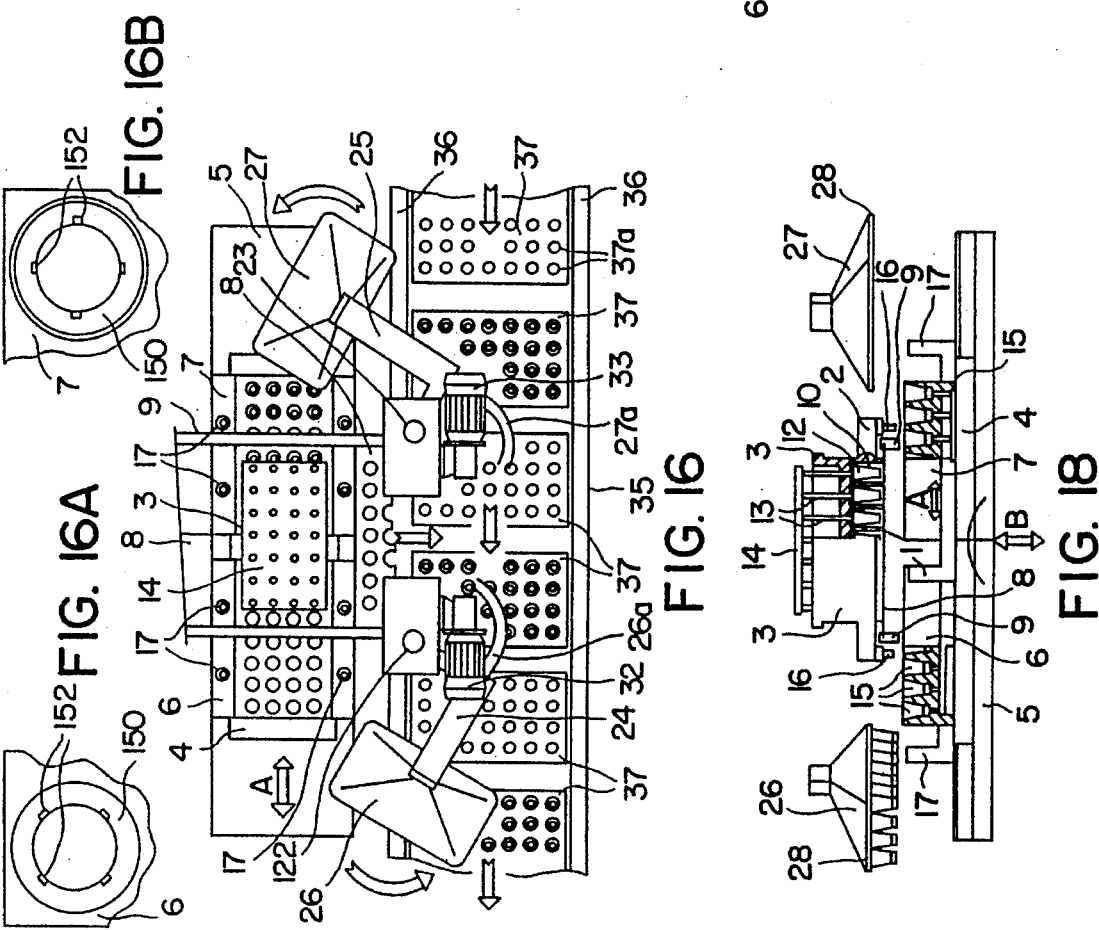

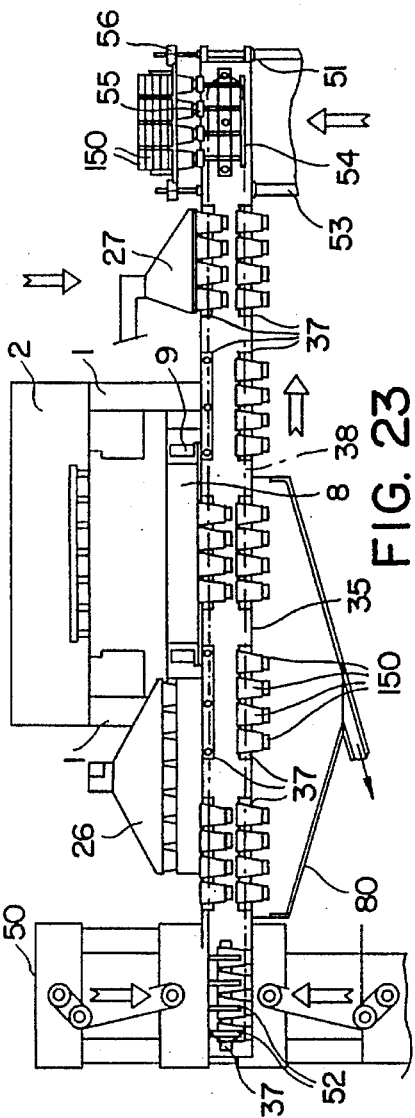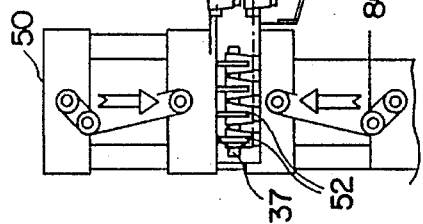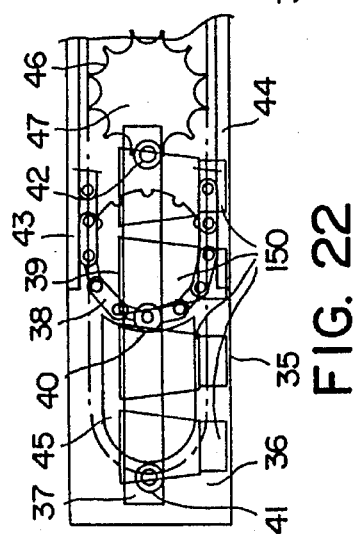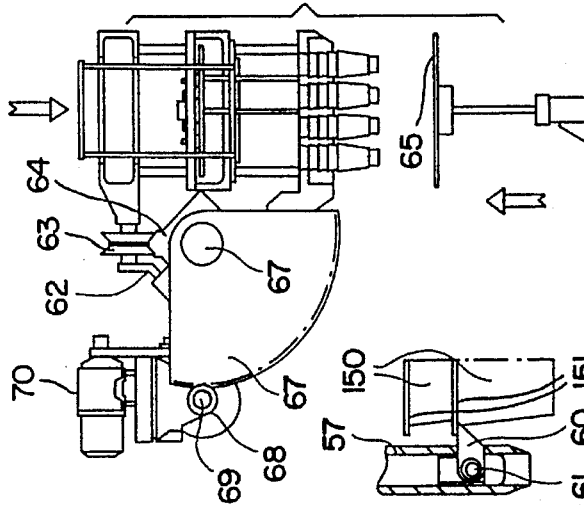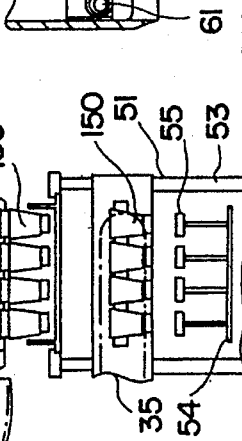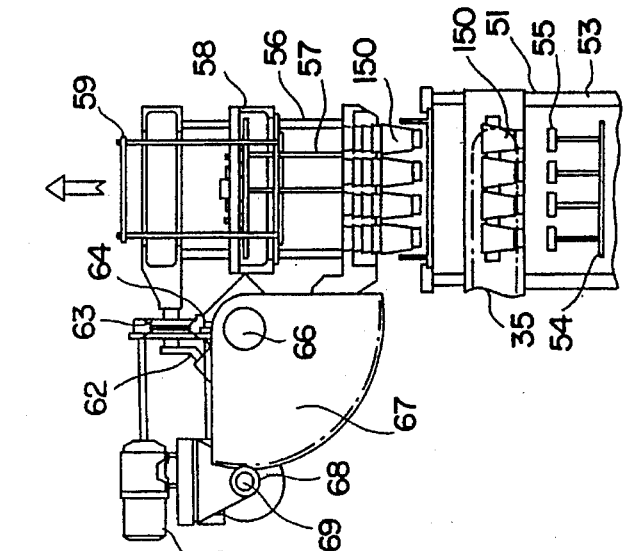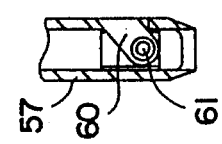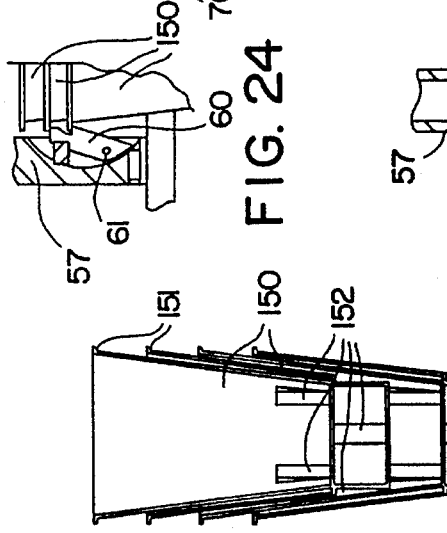

APPARATUS FOR THE THERMOFORMING AND STACKING OF HOLLOW OBJECTS INCORPORATING A BASE FORMED FROM THERMOPLASTICS SHEET MATERIAL

This is continuation application of application Ser. No. 07/937,362 filed on Aug. 28, 1992, now abandoned.

This invention relates to an apparatus for the thermoforming of hollow cup-shaped objects such as beakers, goblets, cups, tubs and the like, from a sheet of thermoplastics material, and their removal from the press in which they are produced.

BACKGROUND OF THE INVENTION

As is known, so-called "thermoforming" machines, fall into two quite separate classes depending upon their method of operation; firstly there are thermoforming machines which form and cut the sheet at separate workstations and secondly there are machines which form and cut the sheet at a single workstation. Such machines are used in the production of objects of thermoplastics material, e.g. "disposable" objects, from a sheet of hot pressed material.

This invention relates to an apparatus which falls into this second class, in that the shaping or forming of objects and their separation from the sheet of starting material is effected at a single workstation.

The state of the art for thermoforming apparatus incorporating a single forming station, separation from the initial sheet and subsequent removal from the press, is represented by conventional single station machines and those according to U.S. Pat. No. 4,560,339 which will be briefly described hereinafter with reference to FIGS. 1 to 13 of the accompanying drawings, in which:

FIG. 1 is a side view in diagrammatic form of a thermoforming machine having an upper male die and a single lower female mould shown in the open press position prior to forming;

FIG. 2 is a side view of the machine of FIG. 1 shown with the press closed during the forming stage;

FIG. 3 is a view similar to that shown in FIG. 2 with the press closed during the cutting stage;

FIG. 3a is a schematic view of a detail of FIG. 3 shown on an enlarged scale;

FIG. 4 is a side view of the machine of FIG. 3 shown with the press open after the formed object has been cut out but still remains in the press;

FIG. 5 is a similar view to that in FIG. 4 but at a subsequent stage in which the pressed object is removed from the female mould and removed from the pressing area to a stacking collector;

FIG. 6 is a side view of a variation of the machine shown in FIG. 5 having a multiple row of moulds which discharge in bulk to a separate stacker;

FIGS. 7 to 10 show diagrammatic views of another variation of the machine shown in FIG. 5, in which the pressed objects are removed from the pressing area by means of a suction plate which can be placed between the male and female parts of the press;

FIG. 11 diagrammatically illustrates a plate which can lift a plurality of articles pressed in a single pressing operation by suction, used in the machine according to FIGS. 7 to 10;

FIG. 12 diagrammatically illustrates a front view of a thermoforming machine having a single upper male die and a double lower female mould which moves alternately beneath the male die; and FIG. 13 includes a diagram which illustrates the stages and opening/closing cycle times for a thermoforming press having a single female mould.

The thermoforming cycle in machines which carry out forming and cutting at a single workstation can be described schematically as follows.

Stage 1: Sheet feed with the press open (FIG. 1)

A portion of sheet material A is delivered from a feed role (not shown) and is heated by irradiators B, e.g. infrared sources, and caused to advance between the open portions of the press, that is into the thermoforming area, in the direction of arrow F. The press consists of an upper male part or die $M_1$ and a lower female part $M_2$. Both parts $M_1$ and $M_2$ may be single or multiple, in which latter case several objects O can be obtained from each pressing operation.

Stage 2: Forming while the press is closed (FIG. 2)

The lower female part $M_2$ rises against fixed male die $M_1$ and object O is hot formed by causing rough shaping die $M_{1p}$ to enter the cavity $M_{2c}$ of female mould part $M_2$ and thereafter injecting compressed air or applying negative pressure through a hole OF in male die $M_1$. The compressed air causes the material A around rough forming die $M_{1p}$ to adhere to the side wall of cavity $M_{2c}$ and movable base $M_{2f}$ thereof. Then cavity $M_{2c}$ is cooled by a water cooling circuit generically indicated by C, and object O is also cooled and then subjected to a process of progressive structural and dimensional stabilisation.

Stage 3: Cutting (FIGS. 3 and 3a)

In this stage, all the lower part $M_2$ of the press moves a distance ST, usually 1.5 mm (FIG. 3a) towards upper die $M_1$, which is sufficient to separate the edge BO of object O from starting sheet material A.

The three stages described above are common to all thermoforming machines which shape and cut at a single workstation, or forming area (see diagram in FIG. 13). However a distinction is made between two classes of thermoforming machines on the basis of the different arrangements used to remove thermoformed objects O from the female mould $M_2$ and subsequent operations (counting, stacking, etc.). The former have a single female mould $M_2$, the latter has a double female mould, one on the left $M_{2c}$ and one on the right $M_{2d}$, which are integral with each other, as will be explained below with reference to FIG. 12 and the object of Italian Patent No. 1,073,243.

The cutting stage (stage 3) completes the closed press cycle of operations (FIG. 13).

After this stage, the lower part $M_2$ of the press descends, or moves away from upper part $M_1$, following an S-shaped track (FIG. 4) carrying with it formed and cut object O, which therefore moves below the waste starting material A. Subsequently moving base component $M_{2f}$ of lower mould $M_2$ ceases its downwards movement while the remaining part of mould $M_2$ continues to move downward, thus drawing out and releasing object O completely from cavity $M_{2c}$ of mould $M_2$.

At this point in the cycle there arises the difficult problem of moving or removing the thermoformed object or objects O from the forming area and stacking them. Various systems have been proposed, and the two most widely in use will be described below.

The first is the air blowing system (FIG. 5) which consists of supplying compressed air along a main CL provided with nozzles U which produce jets G which lift up objects O, causing them to tip slightly or topple into one or more collection channels R. The objects, continuing along collection channel R, become stacked forming a stack P.

This system can however only be used if the objects in mould $M_2$ are arranged in a single file.

If the objects in mould $M_2$ are in several rows (multiple files) the air jets G may remove objects O from the area bounded by parts $M_1$ and $M_2$ of the press, but they will be discharged in bulk. In order to get these back into order and then stack them, it is necessary to have a suitable stacking device PL (FIG. 6), which is separate from the thermoforming machine, but whose function must be synchronised therewith. This naturally involves heavy additional costs, greater complexity in operation and a high percentage of damaged objects which then have to be rejected.

In thermoforming machines provided with a stacker PL, objects O are "removed" by blowing them out of the forming area and causing them to impact against a stop surface AR before falling into a collecting bin V. At the base of collecting bin V there may be provided, as one of a number of possible systems, a conveyor belt collector TR controlled by a Maltese cross device which has a plurality of panels hinged together, each of which has a hole $W_1$ which houses one object O. After impacting against surface AR which is orientated with a well-defined inclination, the objects end up by falling into holes $W_1$ to be then transported intermittently towards a pusher $I_p$ controlled by a toggle E which pushes them one by one into a collection channel R where they form a stack P.

This system, which is mentioned here by way of example as one of many similar types, has many disadvantages.

To begin with, only circular objects which are taller than particular minimum dimensions can be stacked. It is not therefore possible to stack objects which are constrained to a specific orientation, e.g. objects of rectangular shape.

Also, in falling and being mixed together in bin V, many objects become deformed or otherwise damaged.

For these reasons the known system illustrated in FIG. 6, and others like it, are now considered to be obsolete.

The second system using a suction plate is illustrated diagrammatically in FIG. 7 to 11 and is the object of Italian Patent No. 1,175,178. During the opening T of the press, which is effected by lower female mould $M_2$, a suction plate PA is inserted between the upper edge B of thermoformed object O, but below waste A of the starting material, in such a position that object or objects O can be sucked up when mould $M_2$ has finished its descent T (press completely open).

Mould $M_2$ then stops in its lowest position to allow suction plate PA to move away from the area bounded by dies $M_1$ and $M_2$ (forming area—FIG. 8), carrying with it objects O to an area adjacent to the thermoforming machine where they are picked up by suckers VS hinged on arms BG of a stacker R (FIGS. 9 and 10). As soon as plate PA reaches the position illustrated in FIG. 8, and is therefore outside the forming area, mould $M_2$ begins its upwards movement, sheet material A advances by a further step and a new thermoforming cycle is thus initiated. At the same time suckers VS (FIG. 9) takes objects O from plate PA. By means of a rotation of arm BG and a simultaneous rotation about pin Q suckers VS are turned over and carried against a multiple collector R where the objects are stacked into stacks P (FIG. 10).

The difficulties and disadvantages which limit the performance of the extraction system in thermoforming machines with a single female mould are:

1. The very long distance T by which the press must open, which is the sum of the height of the object or objects O and the distance travelled S (FIGS. 4 and 7) plus a specific distance to ensure a reasonable margin of safety (FIG. 7). However, as the time used in moving distance T is time which is of no use to the cycle it will be understood that, other things being equal, the output of the machine will be lower the taller the objects O which have to be removed.

2. Travel S is provided to create the space necessary for plate PA to insert itself between material A and thermoformed object or objects O. Keeping travel distance S short implies creating problems with the size of suction plate PA. Increasing distance S means appreciably lowering the productivity of the thermoforming machine. The definition of track S and the dimensioning of plate PA are therefore always the result of a compromise. However the dimensions of suction plate PA are also governed by the requirement that it must not impede the advance of sheet material A, which being in a heated state, has a tendency to weaken and fall downwards.

3. Keeping the press open for the time required for suction plate PA to enter and leave the forming zone increases the dead time in the thermoforming cycle (FIGS. 7, 8 and 13).

The fact that presses have to stand open for the time required for inserting plate PA between material A and object or objects O which have to be removed, sucking up the objects and removing them (a time which is commonly equal to 30% of the cycle time, i.e. a by no means negligible period) has a greatly adverse effect on the productivity of the machine.

If relatively large objects or small objects in a number of rows are present in mould $M_2$ then the time for moving plate PA increases, because the distance T which has to be travelled is greater, or because plate PA has to travel a back and forth distance which is at least equal to the width LA of mould $M_2$ (FIG. 7).

4. The time for which object or objects O remain in the press, that is with their own walls in contact with the cooled wall of cavity of $M_{2c}$ of mould $M_2$, is another important parameter which affects the productivity of a thermoforming machine. In fact as soon as mould $M_2$ reaches the position illustrated in FIG. 4, object O is displaced away from the wall of cavity $M_{2c}$ and therefore the stabilizing cooling of the plastics material which has been subjected to thermoforming ceases. As may be seen from the diagram in FIG. 13, the cooling time tst for stabilization in the press is the time between the injection of the forming air $t_1$ (through hole FO) and the start of removal $t_3$ (FIG. 4). Normally this time is equivalent to about half the cycle time. When it is necessary to increase cooling time tst the rate of the thermoforming machine has to be slowed.

5. Because the objects are directly sent to the stacker from plate PA it is not possible to carry out any additional operations (e.g. perforation, labelling or the like) on objects O between the removal operation and stacking.

If it is necessary to carry out additional operations on thermoformed and stacked objects O, the objects have to be repositioned, and this usually means destacking them and sending them to suitable machines to carry out the required operations, with a consequent risk of damaging the objects and producing rejects.

One of the greatest disadvantages of thermoforming machines with suction plate extraction lies in the shape and restricted dimensions of the suction plate itself. In fact, with reference to FIG. 11, it will be noted how the pressure difference, between the external environment and the negative pressure created by the suction through plate PA in the space within thermoformed objects O, creates the force by which objects O are attracted to and held against the plate. It can be said to a good approximation that this pressure difference is equal to the loss of head which air flows Q1/2 and Q2/2 and Q3/2 create when passing through slots FE along edges BO.

Within Plate PA then:

the air in section $S_1$ will have a velocity $V_1$ which will cause a flow Q1 to pass, in section $S_2$ it will have a speed $V_2$ which is different from $V_1$ and such as to pass a flow Q1=Q2.

in section $S_3$ the speed will be $V_3$ which is different from $V_1$ and $V_2$ and such as to cause the passage of a flow equal to Q1+Q2+Q3. Ideal operating conditions arise when Q1=Q2=Q3. As suction plate PA has to be inserted between sheet material A and the upper edges BO of objects O, its height dimension must be as small as possible so as not to constrain the distance by which the press opens and make it excessively long. In practice therefore it is preferable to use a configuration in which $V_3$ is very much greater than $V_1$, so that when it is in operation Q1 is greater than Q2, which is in turn greater than Q3. This means that the system operates under conditions which are very far from optimum conditions.

In thermoforming machines which have double lower female mould of the type disclosed in Italian Patent No. 1,053,243 and illustrated diagrammatically in FIG. 12, the objects are formed by alternately coupling the two female parts $M_{2s}$ and $M_{2d}$ with the single upper male part $M_1$.

When dies $M_1$ and $M_2$ are closed the thermoforming takes place in the manner described above in stages 1 and 3.

With such machines it is possible to obtain advantages in subsequent stages, in that:

1) The distance T travelled by the press on opening it independent of the depth or height of the thermoformed objects and may therefore be kept at a minimum value sufficient to feed in material A, with a great reduction in the passive time in the cycle, as is shown in the diagram in FIG. 13.

2) The press remains open only for the time necessary to advance sheet material A and effect the alternate lateral movement of female moulds $M_{2s}$ and $M_{2d}$. These operations take place at the same time, without providing any stoppage for removing thermoformed objects O.

3) The time for which objects O remain in cavity $M_{2c}$ with their walls in contact with the mould is longer than the thermoforming cycle (FIG. 13), because objects O remain in close contact with the die from the time of cutting until the next thermoforming operation in the other female mould. In other words the cooling of a thermoformed object O is extended throughout the following stages:

forming, for example in $M_1$–$M_{2s}$ cutting out press opening lateral movement of the double female mould closing of dies $M_1$–$M_{2d}$ forming in $M_1$–$M_{2d}$ The stacking of objects O on these thermoforming machines takes place in stacker $R_s$ in the case of the objects formed in $M_{2s}$ during forming stage in mould $M_{2s}$ and $R_d$ in the case of those formed in $M_{2d}$.

Base members $M_{2fs}$ and $M_{2fd}$ remove objects O by travelling distance $C_t$ (FIG. 12) and stack them alternately pushing the objects formed in female mould $M_{2s}$ into left hand collection or stacking device $R_s$ and those formed in female mould $M_{2d}$ into right hand collection or stacking device $R_d$. Devices $R_s$ and $R_d$ are located to the sides of the fixed part of die $M_1$. It may happen therefore that objects O which have recessed angular supporting portions (e.g. 2, 3, 4 or more indentations or indented feet located at the same level) provided, as is usual in the art, to prevent one object binding completely within another during stacking, (which would make it impossible for the objects to be then destacked for use), are located in a perfect vertical orientation and alignment, because they all come from the same mould. In this case it will be seen that there is accurate superimposition of two or more consecutive stacked objects, so that the spacing effect of the feet or indentations is neutralized and as a result the objects bind firmly together making it difficult to separate them.

Another cause of poor spacing and therefore of irreversible binding between the stacked thermoformed objects lies in inaccurate forming of the stacking feet or indentations (which generally project towards the interior of the object by a fraction of a millimetre or a little more), being made of a thermoplastics material which is therefore dimensionally unstable at the time of forming, these are obtained with fairly wide dimensional tolerances. There will therefore be variations in the connecting angle to both the feet and the base of each object, depending on the nature of the thermoplastics material used, and the shape and depth of the objects being thermoformed, which are unacceptable for correct stacking of the objects.

Objects which do not destack, or which destack with difficulty, require manual intervention, reduce productivity and almost always end up by increasing the number of rejects.

As will be noted, the distance $C_t$ travelled by base members $M_{2fs}$ and $M_{2fd}$ depends on the maximum height of the objects O being formed and is therefore longer when the objects are deeper. It is essential in fact that interference between the bottom of object O and the lateral movement and closing of the press is avoided.

FIG. 12 illustrates pins $S_p$ which center parts $M_{2s}$ and $M_{2d}$ with respect to fixed part $M_1$ as the press closes, through being inserted by a certain amount into corresponding seats Z provided in mould $M_2$. $A_1$ also indicates diagrammatically the members which feed or advance sheet material A.

As in thermoforming machines having a single female mould, so in machines having a double female mould, stacking of the objects takes place without there being any practical possibility of carrying out additional operations on thermoformed objects O, as these are gathered into stacks immediately after thermoforming.

SUMMARY OF THE INVENTION

An object of this invention is to eliminate or substantially to reduce the disadvantages described above which arise with known thermoforming methods and machines and forms of extraction.

Another object of this invention is to provide extraction of thermoformed objects from the forming zone in a thermoforming apparatus by making use of a suction plate which is not subject to critical dimensional constraints.

A specific object of this invention is to make it possible to carry out a whole series of additional and/or auxiliary operations on the thermoformed objects during each thermoforming cycle, while keeping the objects outside the press in the same mutual positions which they occupied in the forming mould.

Another object of this invention is to provide a substantial reduction in the open press waiting time in order to improve productivity and efficiency.

Another object of this invention is to effect a drastic reduction of up to one half in the height of the press, with a consequent reduction in the masses in movement, the cost of manufacturing the press itself and a substantial increase in the speed of movement or lateral movement of the press.

Yet another object of this invention is to provide the production of thermoformed objects which may be finished through one or more supplementary operations carried out at the same time as a thermoforming operation before stacking and packaging, without it being necessary to restart processing.

In accordance with this invention there is provided apparatus for the thermoforming of hollow objects incorporating a base from a sheet of thermoplastics materials, comprising a male die and a double female mould, one half of which mould can move alternately with respect to the other half for mating with the male die in turn while at the same time carrying the object or objects produced previously in the other half of the female mould to an easily accessible discharge area, a sheet feed to deliver a sheet of thermoforming material in steps between the male and female moulds, a cutting device which is brought into operation at the end of each closing movement of the press, a stepwise conveyor having a plurality of plates or formers, each of which is capable of receiving and supporting the object or objects from one forming operation in the same mutual positions which they occupied in the press, at least one pick-up head capable of lifting one set of formed objects alternately from each half of the double female mould from one side or the other of the male die and of transferring them to a corresponding plate or former on the conveyor and at least one processing or handling station located along the conveyor for the simultaneous handling or processing of all the objects from at least one forming operation.

BRIEF DESCRIPTION OF THE DRAWINGS

FIG. 1 is a side view of diagrammatic form of a thermoforming machine having an upper male die and a single lower female mould shown in the open press position prior to forming;

FIG. 2 is a side view of the machine of FIG. 1 shown with the press closed during the forming stage;

FIG. 3 is a view similar to that shown in FIG. 2 with the press closed during the cutting stage;

FIG. 3a is a schematic view of a detail of FIG. 3 shown on an enlarged scale;

FIG. 4 is a side view of the machine of FIG. 3 shown with the press open after the formed object has been cut out but still remains in the press;

FIG. 5 is a similar view to that in FIG. 4 but at a subsequent stage in which the pressed object is removed from the female mould and removed from the pressing area to a stacking collector;

FIG. 6 is a side view of a variation of the machine shown in FIG. 5 having a multiple row of moulds which discharge in bulk to a separate stacker;

FIGS. 7 to 10 show diagrammatic views of another variation of the machine shown in FIG. 5, in which the pressed objects are removed form the pressing area by means of a suction plate which can be placed between the male and female parts of the press;

FIG. 11 diagrammatically illustrates a plate which can lift a plurality of articles pressed in a single pressing operation by suction, used in the machine according to FIGS. 7 to 10;

FIG. 12 diagrammatically illustrates a front view of a thermoforming machine having a single upper male die and a double lower female mould which moves alternately beneath the male die; and FIG. 13 includes a diagram which illustrates the stages and opening/closing cycle times for a thermoforming press having a single female mould.

Figure 20:
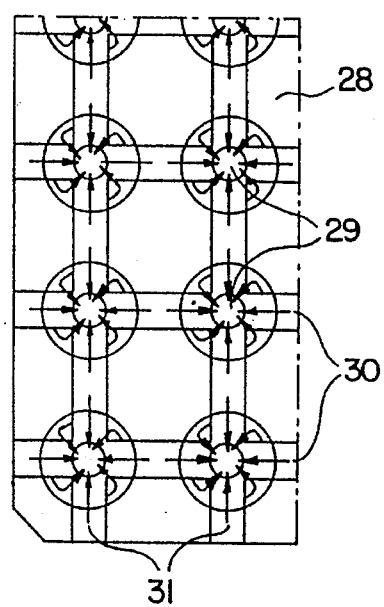
Figure 21A:
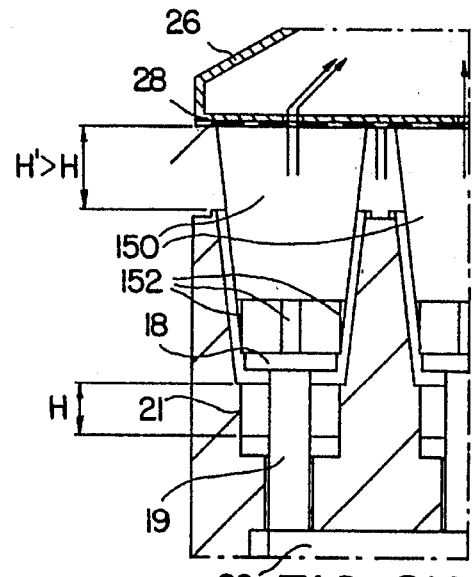
Figure 21B:
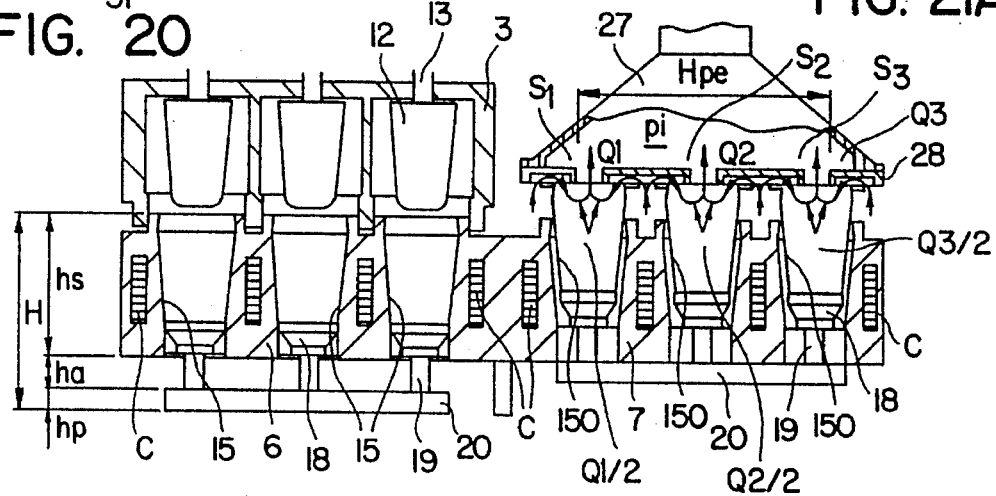
Figure 21C:
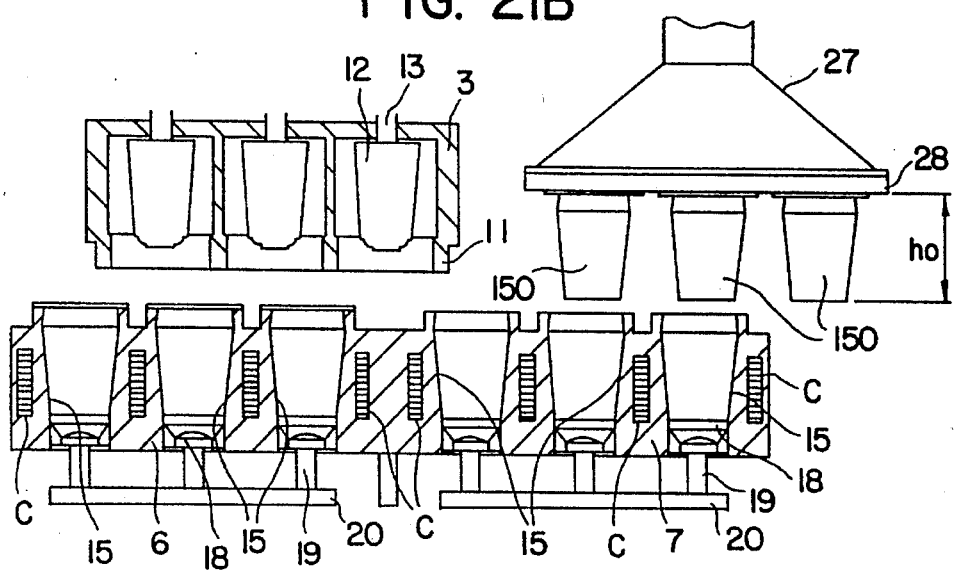
Figure 30:
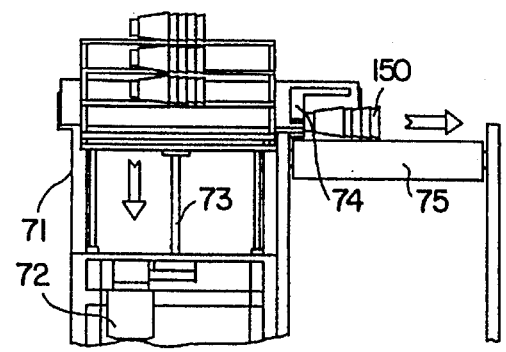
Figure 29:
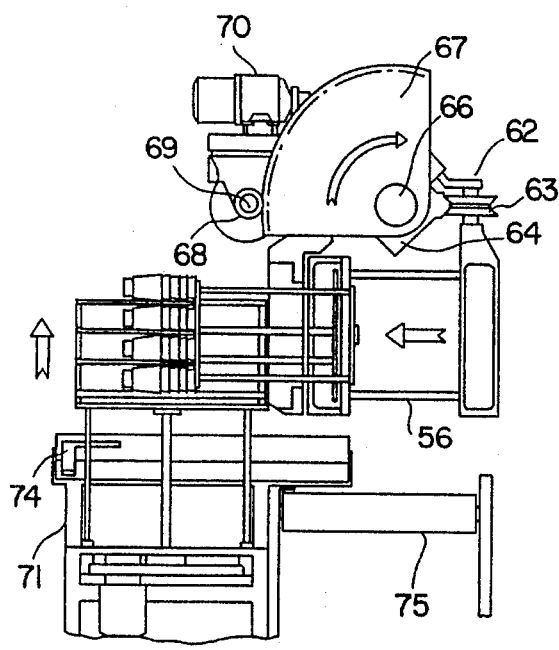
Figure 31:
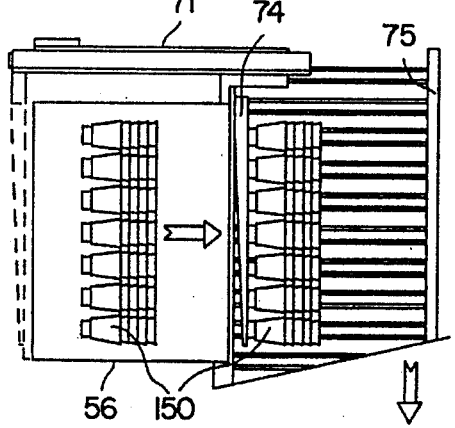
Figure 32:
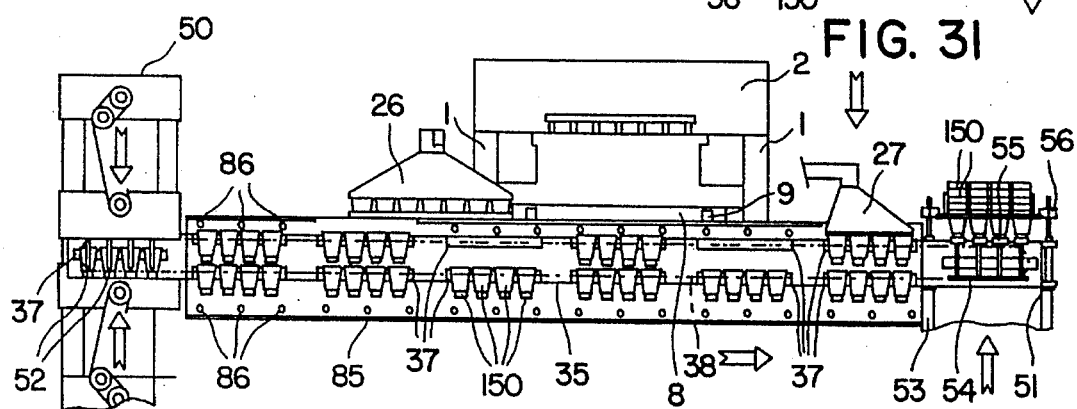
Figure 33:
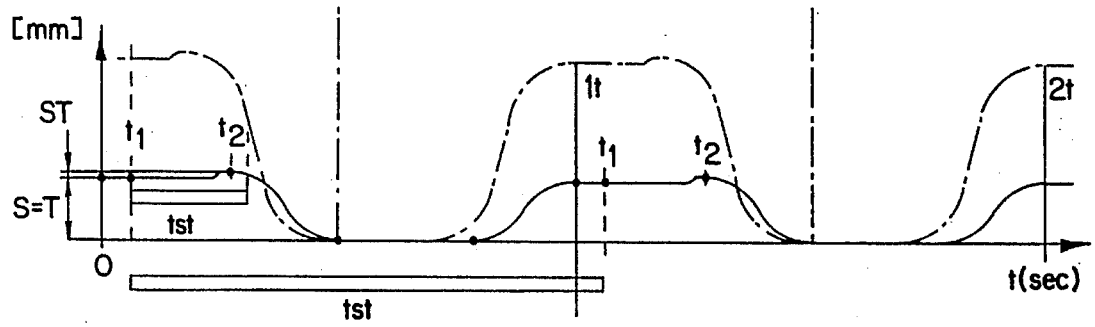

The present invention will be further illustrated, by way of example, with reference to FIGS. 14 to 33 of the accompanying drawings, in which:

FIG. 14 is a front elevational view in schematic form of part of a conveyor utilised in the apparatus of the invention, FIG. 15 is a plan view of the device of FIG. 14, FIGS. 16 and 17 are respectively a plan view and a magnified plan view similar to that shown in FIG. 15, but with the pick-up heads in a different stage of the working cycle, FIGS. 16A and 16B are respectively partial views from above on a magnified scale of the two halves of a double female mould, FIGS. 18 and 19 are elevational views in schematic form of the thermoforming press in two different stages of operation without the stepwise conveyor, FIG. 20 is a view from below and on a magnified scale of a portion of the pick-up head, FIGS. 21A, 21B and 21C show details of FIG. 19 on a magnified scale, FIG. 22 illustrates a detail of FIG. 14 on a magnified scale, FIG. 23 is a view similar to that of FIG. 14, but in a different stage in the operating cycle, FIG. 24 shows a detail of FIG. 23, FIG. 25 is a front elevational view of a stacker which can be used downstream of the stepwise conveyor, during the loading stage, FIG. 25A shows a detail of FIG. 25 on a magnified scale showing the manner in which the thermoformed objects are stacked, FIG. 26 shows a detail of FIG. 25 on a magnified scale, FIG. 27 shows the stacker of FIG. 25 during the stage of discharging onto a plate, FIG. 28 shows a detail of FIG. 26 in a position ready for discharging, FIG. 29 shows the stacker of FIG. 25 in a position for horizontal discharging, FIGS. 30 and 31 diagrammatically illustrate successive stages in the horizontal discharging of the stacker of FIG. 29, FIG. 32 shows a variation with respect of FIG. 23, and FIG. 33 shows a diagram of the thermoforming stages and cycle times for the equipment illustrated in FIGS. 14 to 31, for comparison with the diagram of FIG. 13.

DESCRIPTION OF THE PREFERRED EMBODIMENTS

With reference to the figures listed above, it will be noted that the thermoforming means or press according to this invention comprises a supporting structure 1 on which is mounted a fixed upper plate 2 bearing a male die 3, which in the example illustrated is also fixed, a sliding die-supporting table 4, which is e.g. supported on roller feet suitable for high loads with automatic lubrication (not shown in the drawing) to make horizontal movements (arrow A), and a lower plate 5 which can move in a vertical direction (arrow B—FIG. 18) which is driven by e.g. two toggle units (not shown). Sliding table 4 supports two female moulds (a double female mould) 6 and 7 which are identical and are located alongside each other at the same level, which are intended to be moved by the sliding table 4 alternately beneath the fixed die 3 where they are caused to rise up and mate against the die and successively open by being lowered in order to be moved laterally with respect to the fixed die 3. In other words, mould 6 is moved to the left and mould 7 is moved to the right (as seen in the Figs. in the drawing) with respect to the fixed die 3.

A sheet 8 of thermoplastics material, which may be wound on to a mandrel or be derived directly from an extrusion unit combined with the thermoforming device, is made to advance by means of a chain feed indicated generally by reference numeral 9, in a direction normal to that of the movement of double female mould 6, 7 beneath fixed die 3 but above double female mould 6, 7, in steps, in time with the rate of pressing or forming.

As will be better seen in FIGS. 18 and 19, fixed die 3 may have a plurality of depressions 10 each of which has an open lower end bounded by a free edge 11 (FIGS. 21A and 21B) and houses a corresponding male plug 12 fixed at the end of a corresponding vertical control rod 13 slidably mounted between the upper wall of the fixed die and extending beyond it to meet and be joined to an upper activating bar or plate 14, which is in turn controlled by activating means, not shown in the drawings, e.g. of a type well-known to those skilled in the art. The two female moulds 6 and 7 each have a plurality of upwardly open cavities 15 equal in number to the number of depressions 10 and having the same spacing, in such a way that when a female mould mates with the fixed die each depression or pit 10 accurately mates with a corresponding cavity 15 below.

Centering means comprising e.g. four pins 16 borne by upper plate 2, which are fixed or which can be caused to project to engage in corresponding receiving seats 17 provided in the female mould when the dies are closed together are provided for correct mating between female moulds 6 and 7 and fixed die 3.

The base of each cavity 15 is equipped with an extraction device (FIGS. 18, 19, 21A, 21B and 21C) comprising a head 18 which can move upwards as it is controlled by a corresponding rod 19 which is integral with a control bar or plate 20, which is intended to release and push out one or more thermoformed objects 150 from between the press after the dies have opened.

Advantageously, each cavity 15 may have a constriction 21 forming a step around the formed object, the height of which from the base of the cavity defines the stacking height H for formed objects 150 (FIG. 21A).

Lower plate 5 is driven by suitable units (not shown), for example two toggle units, in order to effect the vertical closing and opening movements between female moulds 6, 7 and fixed die 3.

Two eccentrics, which by causing plate 5 to move through a small distance make it possible to cut out and separate the objects from the sheet, may be provided beneath the base of the two toggle units. This operation, as is usual in the art, is carried out during the closure of female moulds 6, 7 against fixed die 3.

Fixed upper plate 2 has two vertical supporting columns 22 and 23 (FIGS. 15, 16 and 17), on each of which is rotatably mounted a corresponding projecting arm 24, 25 which at its free end bears a suction pick-up head 26, 27, which is constructed e.g. in the shape of a bell cup which is closed off at the base by a perforated suction plate 28 communicating with a source of vacuum or negative pressure above in order to draw out the air, such as a suction pump, which is not shown, by means of a flexible conduit 26a and 27a. As may be better seen in FIG. 20, plate 28 has a plurality of through holes 29 placed in an orderly arrangement at a distance from the intersection of longitudinal 30 and transverse 31 suction grooves, advantageously with a spacing equal to that of cavities 15 in female moulds 6 and 7.

Arms 24 and 25 are located on one side respectively of fixed die 3 and are caused to move angularly about columns 22 and 23 between a position in which corresponding pick-up head 26 and 27 is above a corresponding female mould 6 or 7, when this is moved laterally completely away from fixed die 3, and a position outside the thermoforming machine by a corresponding motor/reduction gear unit 32, 33 driven in such a way as to cause pick-up heads 26, 27 to make rhythmical angular movements in time with the back and forth alternating movements of moulds 6 and 7 in order to effect the transfer of thermoformed objects 150, as will be further described hereinafter.

Within the radius of action of arms 24 and 25 there is located a stepwise conveyor 35 (FIGS. 14, 15, 16, 22 and 23), which is formed of two sliding and supporting sides or banks 36, a plurality of plates or formers 37 slidably supported by the sides and drawn at their two opposite ends by a pair of chains 38 which pass round a pair of chain-wheels 39 at the ends of the conveyor (FIG. 22). Each plate or former 37 has an intermediate pin 40 providing an articulation to a chain 38 and two lateral rollers 41 and 42 at each end thereof which engage with the chains. Alongside the banks 36 rollers 41 and 42 are free or may run along corresponding straight upper 43 and lower 44 guides or rails, while at the transmission end of the conveyor, pin 40 is caused to follow a circular path around a wheel 39, the front roller (with respect to the direction of movement, e.g. roller 41 in FIG. 22) is caused to follow a track which is also circular along a corresponding fixed guide 45 which has the same radius of curvature as the original curvature of the wheel 39 and the rear roller (roller 42 in FIG. 22) is engaged between two radiused teeth 46 of a wheel 47 which has its own axis of rotation along the line of the wheel 39 and the said pitch line. With this arrangement, at the ends of conveyor 35 each plate or former 37 is returned to a position which is always parallel to the other plates or formers and when in the discharge position is relatively far from the plate or former which preceded it and the one which follows it.

It is therefore possible to provide a treatment or processing station 50 (FIGS. 14 and 23) and a stacking station 51 at the transmission ends of conveyors 35 and possible intermediate treatment or processing stations as will be described below.

Processing station 50 is designed to perform various operations on formed objects 150, which are located in an easily accessible position for working units provided at the said station, while in stacking station 51 the formed objects can be stacked before finally being removed from conveyor 35.

Plates or formers 37 each have a plurality of holes or seats 37a having the same diameter (or a slightly smaller diameter) and the same spacings as cavities 15 in female moulds 6 and 7, so that they can receive the objects obtained from a forming operation transferred thereto by heads 26 and 27. Plates or formers 37 are moved stepwise along an upper track along conveyor 35, along which they receive formed objects 150 from heads 26 and 27 alternatively, are stopped sequentially in a stepwise manner at processing station 50 and are then passed along a lower track to reach stacking station 51.

Treatment or processing station 50 may be designed to carry out any desired additional operation, such as e.g. perforating the bases of shaped objects 150, dry printing or stamping of the objects, labelling, filling with soluble beverage powders, sterilisation, etc.

In FIGS. 14 and 23, station 50 is illustrated by way of example by a toggle driven drilling head equipped with drilling bits 52 arranged with the same spacing as holes 37a and formers 37 and operated with the same operating rhythm as stepwise conveyor 35.

However any other suitable operating unit capable of carrying out a desired process or manipulation upon the formed objects may be provided instead of or in association with toggle-operated driving unit 50.

Stacking station 51 (FIGS. 14 and 23 to 29) comprises a supporting frame 53 upon which is located the downstream end of conveyor 35, a lower pusher 54 which can be driven in an alternating vertical back and forth motion in time with the stepwise operation of conveyor 35 and having a plurality of pusher heads 55 equal in number to and having the same spacing as holes 37a in formers 37, and a stacker 56 placed above conveyor 35 in vertical alignment with pusher 54. Stacker 56 may be of any suitable type, e.g. having a plurality of parallel tubular rods 57 held together by a frame 58 (FIG. 25) on which is also slidably mounted an upper pusher 59 which can also be driven in an alternating back and forth motion as will be described below.

Each rod 57 is advantageously provided with teeth 60 (FIGS. 26 and 28) which are retractable in that they are hinged about a transverse axis 61 so that they can be moved angularly between a position in which they are withdrawn into the rod (FIG. 28) so that objects 150 can slide between the rods and a position in which they project from the rod (FIG. 26) to engage an edge 151 of an object 150.

As will be better seen from FIGS. 16A, 16B and 25A, it is possible to arrange matters in such a way that female mould 6 produces objects identical to those produced in female mould 7, but having e.g. four feet or indentations 152 offset by a predetermined angle in such a way that given that the stacks of objects at station 51 are formed from objects deriving from mould 6 and mould 7 alternately, because these are loaded onto formers 37 of conveyor 35, the flat part of the base of an object 150 (even when the bottom edge has a relatively large connecting angle) is always brought to rest against a sufficient number of feet 152.

A similar result is achieved if instead of having a different angular orientation of feet 152 in the two female moulds, a different number of feet 152 are provided. This naturally makes it possible to have a perfect stacking arrangement at all times without any risk of permanent or irreversible binding between objects 150 and thus reducing the number of rejects.

Stacker 56 is supported on a trolley structure 62 which can run by means of wheels 63 along a beam or section 64 to transfer a plurality of stacks of objects 150 from stacker 56, e.g. onto a standing and supporting surface 65, which may if desired be capable of being raised and lowered, as shown diagrammatically in FIGS. 25 and 27.

Beam 64 may be rotatably supported around its own longitudinal axis 66 and may have angular projections around it through a toothed section 67 which engages a toothed pinion 68 keyed onto drive shaft 69 of a motor/reduction gear unit 70. With this arrangement, stacker 56 can be inclined through 90 degrees or any intermediate angle thus placing it, for example, in a horizontal position and setting it down onto a supporting platform 71 (FIGS. 29 to 31). Platform 71 is designed to perform a stepwise descending movement (through a transmission 72, a screw 73 and a corresponding nut) to enable a transverse expeller 74 to transfer a row of stacked objects 150 to a cage conveyor 75 which carries the stacked objects to e.g. a packing station.

The functioning of the means described above is extremely simple. When the press is open a predetermined length of sheet 8 is caused to advance by means of chain feed 9 beneath fixed die 3, whereupon female mould 6 or 7 (e.g. die 6) which is located beneath the fixed die is raised and mated against die 3 with the consequent thermoforming of objects 150 and the subsequent cutting thereof. Mould 6 together with mould 7 move downwards to open the press and immediately afterwards mould-bearing table 4 moves laterally so as to carry mould 6 completely away from fixed die 3 and mould 7 beneath die 3 ready for the next thermoforming cycle.

In the meantime pick-up head 26 is moved into the extraction area above female mould 6, which is now completely unobstructed, and as soon as mould 7 closes against the fixed die it removes formed objects 150 from mould 6, which had been previously removed or loosened from cells 15 by heads 18 of the extraction device. Rotating around its column 22 (FIG. 16) head 26 moves above a former 37 on conveyor belt 35 and deposits formed objects 150 into an identical number of holes 37a (FIGS. 15 and 16).

In the subsequent forming, cycle pick-up head 27 moves over mould 7 which has been moved laterally with respect to fixed die 3 into the extraction area and, with a similar movement to that of head 26, transfers formed objects from mould 7 to former 37 on conveyor 35 in a similar way. In this way, head 27 will set objects 150 down on alternate formers on the conveyor. The same will be done by pick-up head 26, but on the formers left unoccupied by head 27, so that all formers 37 are finally filled with objects 150 before they are delivered to processing station 50.

It will be noted that the fact that each formed object is transferred to stepwise conveyor 35 and remains there makes it possible to extend the stabilization times tst outside the press considerably, which is an advantageous feature for improving the quality of formed objects 150. In fact in the example illustrated objects 150 are supported on the formers of conveyor 35 for seven or more thermoforming cycles.

From time to time it is possible to sample objects 150 from a former 37 selected at random to check the quality of objects 150 without this producing the slightest disturbance in the equipment's operating cycle.

At workstation 50 the objects are processed or partly filled with powder material, or labelled etc., and are then passed along the lower portion of conveyor 35 towards stacking station 51, from which they are removed in stacks to be delivered for use or to a packing station for delivery. Even while they are moving along the lower portion of the conveyor they undergo prolonged stabilization, and remain in the same mutual positions as they had in the thermoforming press.

It will be noted how, in addition to providing easy and uniform control of the internal negative pressure over the whole working surface of plate 28, the use of suction pick-up heads 26 and 27 is applicable to all applications and is not dependent on the existence of an edge 151 on the objects being picked up. Also, contrary to the situation in conventional systems, through the use of heads 26 and 27 the movement for extracting objects 150 from the presses is equal to the stacking height H (FIG. 21A).

More particularly, with reference to FIG. 21B when a mould 6 or 7 (e.g. mould 6) is moved into the extraction or discharge position, head 26 is moved into a position above mould 6 at the same time, as already mentioned. The distance ho which extraction device 18 and 20 has to move for partial extraction of objects 150 before these are picked up by head 26 is effected while part 7 of the press is carrying out another thermoforming cycle. This also applies to the subsequent extraction movements performed by head 27, for its rotation and the deposition of objects 150 to formers 37 and to its return into position above mould 7 so that no dead times are added to any of the forming cycles.

This means that waiting times during which the press is open, which as mentioned above with reference to thermoforming machines with a suction plate which enters into the pressing or forming area itself represents 30% of the thermoforming cycle, are drastically reduced.

It will also be noted how the removal of objects 150 is only partly entrusted to the movement of the heads or bases 18. The objects are in fact removed (FIG. 21C) by means of the movement separating the mould and the plate, partly caused by lowering of the mould and partly by the raising of bases 18. Because these movements take place simultaneously with other dead times in each forming cycle they do not affect the productivity of the equipment.

If a comparison is made between the machine according to the known state of the art in FIG. 11, it will easily be noted that, if ho is the height of objects 150, hp is the height of control plate 20, ha is the length of the approach travel for stacking, and hs is the dimension (height) of a double female mould 6, 7, the total height H of a mould $M_{2s}$ and $M_{2d}$ in FIG. 12 will be the sum Ho=hp+ho+ha+hs.

The height of female moulds 6 and 7 in FIG. 21B according to this invention is instead H=hp+ha+hs, that is H is Ho less than an amount equal to at least the maximum height of the thermoformed objects 150. Because the height Ho of the mould in a conventional machine with stacking is usually slightly greater than twice the height of the thermoformed objects, it can be concluded that the extraction performed by heads 26 and 27 in the appropriate extraction or discharge areas completely outside the pressing area and away from fixed die 3 at least halves the height of female moulds 6 and 7.

The reduction in the height of the moulds brings about an appreciable decrease in their weight, and therefore their inertia, which means that more rapid lateral movements can be performed.

Also, it will be noted from FIG. 21B that mould 7 is illustrated in the extraction or discharge position. The fact that mould 7 is moved in a position completely outside the pressing or thermoforming area has made it possible to dimension suction heads 26 and 27 in such a way that the sum of the flows (Q1+Q2+Q3) all passes through section Hpe. In sections S1, S2 and S3 the rates of flow will be identical in each and therefore the value of the pressure pi which is set up within the head will be uniform over the entire surface of plate 28. This has the result of optimising the most important parameter for the satisfactory operation of a pick-up head 26, 27, with the result that it is possible to achieve the optimum condition in which Q1=Q2=Q3.

The invention described above may be subjected to numerous modifications and variations within the scope thereof. Thus, for example, conveyor 35 may be replaced by a conveyor with an empty return track, or with empty formers 37, after being passed around a terminal return wheel of considerable diameter or a number of return wheels in such a way that stations 50 and 51 can operate on its upper track. Here again processing stations 50 may be more than one in number and may be arranged in sequence along the conveyor.

If desired, station 50 may be omitted or in any event may be left inactive for particular types of object 150.

Furthermore, as illustrated in FIGS. 23 and 32, a suction hood 80 for the volatile residues produced from thermoplastic material A which is used for the thermoforming of objects 150 may advantageously be provided in any suitable position above, around or below conveyor 35. A tunnel treatment chamber 85, e.g. for sterilization and/or heat conditioning, which may surround at least one portion of conveyor 35 and which may be provided with a plurality of needles 86 intended for the injection of a fluid, such as cold air, to achieve optimum stabilization of objects 150 outside the press is also illustrated diagrammatically in FIG. 32.

If desired, downstream of each pick-up head 26 and 27 a rim curling workstation is arranged to form curled rims on all the objects formed in the same moulding operation immediately after they have been discharged on a plate or former 37. In this case the conveyor 35 has a correspondingly greater length by at the least two plates or formers, whereby making it possible for the objects to be formed with a curled rim within the cyclic time while being still hot as they have just been picked up from the mould 6 or 7, and thus there is no need to heat them just for the rim finishing operation before reaching the processing station 50.

Materials and dimensions may be varied in accordance with requirements.

I claim:

1. Apparatus for thermoforming of hollow objects from a sheet of thermoplastic material, the apparatus comprising:

a support frame, a male die mounted on the support frame, a double female mold having female cavities thereof facing the male die to effect alternate transverse movements with respect to the male die between an operation position in which one half of the female mold is located in front of the male die and the other half is in an easily accessible side discharge position away from the male die;

driving means for controlling the alternate transverse movements of the double female mold;

a stepwise sheet feeder arranged to feed a sheet of thermoformable heated material between the male die and the double female mold;

actuation means to effect closing and opening movement between the male die and the double female mold when one half of the female mold is in said operation position, in a direction normal to the alternate transverse movements and in sequential synchronization therewith, thereby forming hollow objects;

a cutting device having control means for actuation during mating engagement between the male die and the female mold to cut out an object from the sheet of thermoformable material;

a stepwise endless chain conveyor having a sequence of plate formers each of which receives the object in one forming operation, the chain conveyor being arranged to operate in synchronization with the driving means;

at least one processing pick-up head capable of lifting a plurality of objects alternately from each half of the double female mold when in the discharge position and transferring the objects thus lifted into a respective plate former on the conveyor; and at least one processing station located along the conveyor for carrying out sequential processing each time of all of the objects while loaded in a plate former on the conveyor in synchronization with said driving means.

2. The apparatus as claimed in claim 1 wherein the pick-up head has an upper portion, a perforated suction plate arranged underneath the upper portion and being provided with a plurality of through holes for air which are in communication with an interior of the pick-up head and have the same spacing and the same arrangement as the cavities in the double female mold, a source of vacuum or negative pressure in communication with the upper portion, an activating arm designed to move the pick-up head between a pick-up position above a female mold and a release position above a former on the stepwise conveyor, and actuator means for the movement of the double female mold so as to transfer the object from each forming operation by drawing up edges thereof to the suction plate and causing them to at least partly adhere thereto.

3. The apparatus as claimed in claim 1 wherein at least one suction hood is located alongside the conveyor to remove volatile vapors from the thermoforming process.

4. The apparatus as claimed in claim 1 further comprising a stacker station for receiving the objects, the stacker station being placed downstream of a last processing station along the conveyor.

5. The apparatus as claimed in claim 4 wherein the stacker station comprises a vertical stacker, a slide guide rotatably mounted about its own longitudinal axis, a trolley structure for slidably mounting the stacker station along the guide and arranged to transfer a plurality of stacks of objects from the stacker station to a supporting surface, and activating means to rotate a supporting guide in a controlled way so that the stacker station can be selectively oriented once it has been moved away from the conveyor.

6. The apparatus as claimed in claim 1 wherein said at least one processing station comprises a drilling unit equipped with as many drilling tools as there are objects on each former.

7. The apparatus as claimed in claim 6 wherein the drilling unit is operated by a toggle device.

8. The apparatus as claimed in claim 1 wherein said at least one processing station includes a labelling unit.

9. The apparatus as claimed in claim 1 wherein said at least one processing station includes at least one rim curling work station downstream of each pick-up head.

10. The apparatus as claimed in claim 1 wherein said at least one processing station includes at least one sterilization unit.

11. The apparatus as claimed in claim 10 wherein the sterilization unit includes a tunnel chamber placed alongside one length of the conveyor.

12. The apparatus as claimed in claim 1, wherein the stepwise conveyor has two draw chains, a pair of toothed returning wheels for each chain at the ends of the conveyor, an idling toothed wheel and a slide guide placed opposite each toothed returning wheel, an articulated attachment on two opposite sides of each former articulated to the draw chains, two engaging means on each former located on opposite sides with respect to each articulated attachment, one engaging means slidable engaging the idling toothed wheel and the other engaging means engaging the slide guide at an end of the conveyor.

13. The apparatus as claimed in claim 1 wherein one half of the female mold is shaped to produce stacking spacing feet on the thermoformed objects which differ in orientation, position and size from corresponding feet produced in the other half so as to ensure perfect stacking of the objects without binding them together.

* * * * *